United States Patent
Lee et al.

(10) Patent No.: US 8,988,973 B2
(45) Date of Patent: *Mar. 24, 2015

(54) SMART WATCH AND CONTROL METHOD FOR THE SAME

(71) Applicant: LG Electronics Inc., Seoul (KR)

(72) Inventors: Doyoung Lee, Seoul (KR); Yongsin Kim, Seoul (KR); Hyorim Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/019,218

(22) Filed: Sep. 5, 2013

(65) Prior Publication Data

US 2014/0313867 A1 Oct. 23, 2014

Related U.S. Application Data (63) Continuation of application No. 13/912,729, filed on Jun. 7, 2013, now Pat. No. 8,854,925.

(30) Foreign Application Priority Data

Apr. 22, 2013 (KR) ........................ 10-2013-0044001

(51) Int. Cl.
G04B 47/00 (2006.01)
G04C 19/00 (2006.01)
G04C 17/00 (2006.01)
G04G 21/00 (2010.01)
G04G 9/00 (2006.01)

(52) U.S. Cl.
CPC .............. *G04G 21/00* (2013.01); *G04G 9/0005* (2013.01)
USPC .............. 368/10; 368/82; 368/223; 455/575.6

(58) Field of Classification Search
CPC ......... G04B 47/00; G04C 19/00; G04G 19/12
USPC .............. 368/10, 13, 281, 282, 223; 340/540, 340/573.1; 455/567, 575.6
See application file for complete search history.

(56) References Cited

U.S. PATENT DOCUMENTS 6,061,304 A * 5/2000 Nagata et al. ................... 368/66
6,218,958 B1 4/2001 Eichstaedt et al.

(Continued)

FOREIGN PATENT DOCUMENTS

| KR | 20-0120590 Y1 | 2/1997 |
| KR | 10-2009-0101742 A | 9/2009 |
| KR | 10-2010-0130478 A | 12/2010 |

*Primary Examiner* — Vit W Miska
(74) *Attorney, Agent, or Firm* — Birch, Stewart, Kolasch & Birch, LLP (57) ABSTRACT

Discussed are a smart watch and a control method for the same, which provide a notification indicating events, which are scheduled to occur later on the basis of a take-off time, if the smart watch is taken off. The smart watch includes a display unit to display content, a communication unit to perform transmission/reception of data, and a sensor unit to detect an input signal with regard to the smart watch and transmit the signal to a processor that serves to control the aforementioned units. The processor detects a take-off signal, indicating separation of the smart watch from a user, in a worn mode, to switch the smart watch to an unworn mode in response to the detected take-off signal, and provides a notification indicating at least one event that is scheduled to occur after detecting the take-off signal in the unworn mode.

9 Claims, 10 Drawing Sheets

(56) References Cited

U.S. PATENT DOCUMENTS

| | | | |
|---|---|---|---|
| 6,320,822 B1* | 11/2001 | Okeya et al. | 368/66 |
| 6,762,685 B2* | 7/2004 | Muto et al. | 340/573.1 |
| 8,199,126 B1 | 6/2012 | Taubman | |
| 8,483,779 B2* | 7/2013 | Atsumi | 455/574 |
| 2008/0220824 A1* | 9/2008 | Miyoshi et al. | 455/567 |
| 2009/0180355 A1* | 7/2009 | Cartwright | 368/12 |
| 2010/0056208 A1* | 3/2010 | Ashida et al. | 455/556.1 |
| 2011/0014956 A1 | 1/2011 | Lee et al. | |
| 2012/0188981 A1 | 7/2012 | Chang et al. | |

* cited by examiner

SMART WATCH AND CONTROL METHOD FOR THE SAME

This application is a Continuation of co-pending application Ser. No. 13/912,729 filed Jun. 7, 2013, which claims the benefit of Korean Patent Application No. 10-2013-0044001, filed on Apr. 22, 2013. The entire contents of all of the above applications are hereby incorporated by reference.

BACKGROUND OF THE INVENTION

1. Field of the Invention

The disclosure relates to a smart watch and a control method for the same, and more particularly to a method to provide a notification indicating events, which are scheduled to occur in the smart watch after detecting the take-off signal, if a smart watch is taken off.

2. Discussion of the Related Art

Development of wearable computers is accelerating with advances in technologies. Here, wearable computers refer to computers that a user can naturally wear, like clothes, watches, glasses, and accessories. Smart-phones or tablet PCs may be inconvenient because the user has to put a smart-phone or tablet PC in a pocket or bag or to hold the same, although the user may easily manipulate the smart-phone or tablet PC with fingers or a touch pen. On the contrary, wearable computers may achieve better portability than smart-phones or table PCs.

In particular, as one kind of wearable computers, a variety of products of a wrist watch, i.e. of a smart watch, through which the user can access a variety of online services, such as, for example, diary, messages, notifications, and stock quotes services, in a wireless manner, has appeared. In the case of the smart watch, it may not be continuously used, but be taken off and neglected for a long time despite limited battery usage time thereof. Accordingly, it may be necessary to display different content on the smart watch according to whether or not the smart watch is worn by the user.

SUMMARY OF THE INVENTION

Accordingly, the present invention is directed to a smart watch and a control method for the same that substantially obviate one or more problems due to limitations and disadvantages of the related art.

In one embodiment, an object of the disclosure is to provide a smart watch which provides a notification indicating at least one event that is scheduled to occur after detecting a take-off signal, if the smart watch detects a take-off signal, thereby assisting a user in predicting an up-coming event even in a state in which the smart watch is taken off.

Another object of the disclosure is to provide a smart watch which provides a notification indicating at least one unconfirmed event in response to take-off detection if the smart watch detects a take-off signal, thereby assisting a user in confirming a notice, a message, or the like that has not been confirmed while the smart watch is worn by the user.

A further object of the disclosure is to provide a smart watch which may detect surrounding information even in an unworn mode, which enables mode switching of the smart watch based on the detected surrounding information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a smart watch comprising a display unit configured to display content, a communication unit configured to transmit and receive data, a sensor unit configured to detect an input signal to the smart watch and transmit the detected input signal to a processor, and the processor configured to control the display unit, the communication unit, and the sensor unit, wherein the processor is further configured to detect a take-off signal in a worn mode of the smart watch, wherein the take-off signal is a signal indicating that the smart watch is separated from a user, switch the smart watch to an unworn mode in response to the detected take-off signal, and provide a notification indicating at least one event that is scheduled to occur in the smart watch after detecting the take-off signal, in the unworn mode.

According to one embodiment, there is provided a control method for a smart watch, comprising detecting a take-off signal in a worn mode of the smart watch, wherein the take-off signal is a signal indicating that the smart watch is separated from a user, switching the smart watch to an unworn mode in response to the detected take-off signal, and providing a notification indicating at least one event that is scheduled to occur after detecting a take-off signal, in the unworn mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Although the terms used in the following description are selected, as much as possible, from general terms that are widely used at present while taking into consideration of the functions of the disclosure, these terms may be replaced by other terms based on intensions of those skilled in the art, customs, emergence of new technologies, or the like. In addition, in a particular case, terms that are arbitrarily selected by the applicant of the disclosure may be used. In this case, the meanings of these terms may be described in corresponding description parts of the embodiments. Accordingly, it should be noted that the terms used herein should be construed based on practical meanings thereof and the whole content of this specification, rather than being simply construed based on names of the terms.

Moreover, although the embodiments will be described herein in detail with reference to the accompanying drawings and content described in the accompanying drawings, it should be understood that the disclosure is not limited to or restricted by the embodiments.

Figure 1:
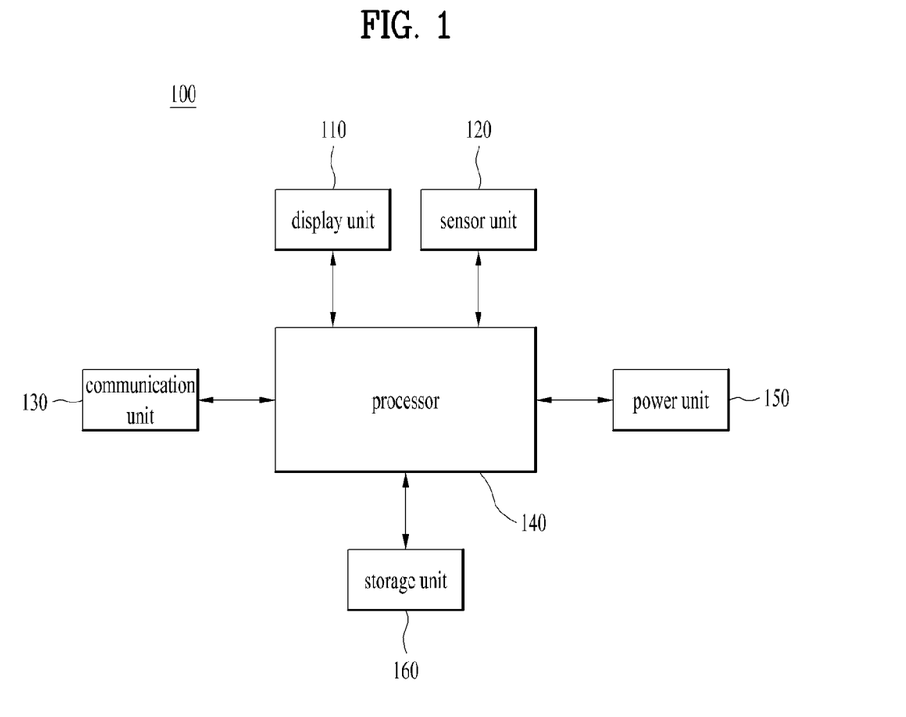
FIG. 1 is a block diagram of a smart watch according to the disclosure.

FIG. 1 is a block diagram of a smart watch according to the disclosure. Referring to FIG. 1, the smart watch 100 may include a display unit 110, a sensor unit 120, a communication unit 130, a processor 140, a power unit 150, and a storage unit 160.

The display unit 110 may output an image on a display screen. In addition, the display unit 110 may output an image based on content processed in the processor 140, or based on a control instruction of the processor 140. For example, the content may include various videos and stationary images. In this disclosure, the display unit 110 may display a notification indicating at least one event that is scheduled to occur after detecting the take-off signal. More particularly, the display unit 110 may display a letter notification or image notification indicating at least one event, which is scheduled to occur after detecting the take-off signal.

The sensor unit 120 may detect an input signal using at least one sensor equipped in the smart watch 100, and transmit the detected input signal to the processor 140. In this case, the sensor unit 120 may include a plurality of sensing means. In one embodiment, the plurality of sensing means may include a gravity sensor, geomagnetic sensor, motion sensor, gyro sensor, accelerometer, infrared sensor, inclination sensor, brightness sensor, height sensor, olfactory sensor, temperature sensor, depth sensor, pressure sensor, bending sensor, audio sensor, video sensor, Global Positioning System (GPS) sensor, grip sensor, and touch sensor, for example. The sensor unit 120 may be a generic term for the above enumerated various sensing means. Also, the sensor unit 120 may sense a variety of user inputs and user environments and may transmit the sensed result to the processor 140 to allow the processor 140 to implement an operation based on the sensed result. The above enumerated sensors may be provided as individual elements included in the digital device 100, or may be combined to constitute at least one element.

According to the disclosure, the sensor unit 120 may detect a take-off signal in a worn mode of the smart watch 100. Here, the take-off signal may correspond to a signal indicating that the smart watch 100 is separated from a user. The take-off signal may be detected via a rear surface of the smart watch 100 or via a buckle of the smart watch 100. This will hereinafter be described in detail with reference to FIG. 2. In addition, according to the disclosure, the sensor unit 120 may detect a wear signal of the smart watch 100. Here, the wear signal may correspond to a signal indicating that the smart watch 100 is worn by the user. Likewise, the wear signal may be detected via the rear surface of the smart watch 100 or via the buckle of the smart watch 100.

Additionally, according to the disclosure, the sensor unit 120 may detect surrounding information on the smart watch 100. Here, the surrounding information may include, for example, audio information, position information, temperature information, and pressure information detected via the smart watch 100.

The communication unit 130 may establish communication with an external device using various protocols, and may perform data transmission/reception thereby. In addition, the communication unit 130 may be connected to a network in a wired or wireless manner, thereby performing transmission/reception of digital data, such as content, etc. In the disclosure, the smart watch 100 may perform pairing with an external digital device using the communication unit 130. Through the pairing, the smart watch 100 may further establish communication with the external digital device. This will hereinafter be described with reference to FIG. 3. In addition, the smart watch 100 may receive a notification indicating at least one event that is scheduled to occur after detecting the take-off signal, if the smart watch 100 detects a take-off signal that is transmitted from the external digital device using the communication unit 130.

The processor 140 may process content received via data communication, or content stored in the storage unit 160, for example. In addition, the processor 140 may execute various applications and process data, and may control the above enumerated respective constituent units of the smart watch 100 as well as data transmission/reception between the units.

In the disclosure, the processor 140 may detect a take-off signal in a worn mode of the smart watch 100, and switch the smart watch 100 to an unworn mode in response to the detected take-off signal. In addition, in the disclosure, the processor 140 may provide a notification indicating at least one event that is scheduled to occur after detecting the take-off signal. The operation of the processor 140 will hereinafter be described in detail with reference to FIGS. 4 to 8.

The power unit 150 refers to a power source connected to an internal battery of the smart watch 100 or an external power source, and may supply power to the smart watch 100.

The storage unit 160 may store various digital data, such as videos, audios, photographs, applications, etc. The storage unit 160 may store programs for process and control of the processor 140, and perform a function for temporary storage of input/output data. The storage unit 160 may include various digital data storage spaces, such as a flash memory, Random Access Memory (RAM), Solid Stage Drive (SSD), etc.

In one embodiment of the disclosure, various operations of the smart watch 100 may be controlled by the processor 140. Moreover, the operations of the smart watch 100 may be stored in the storage unit 160 and controlled by applications that are executed by the processor 140. For convenience, in the drawings and the following description, the aforementioned operations will be illustrated and described as being performed or controlled by the smart watch 100.

The smart watch 100 according to one embodiment is exemplarily shown in the block diagram of FIG. 1, in which separate blocks logically classify elements of the smart watch 100. Thus, the aforementioned elements of the smart watch 100 may be mounted as a single chip or a plurality of chips based on device design.

Figure 2:
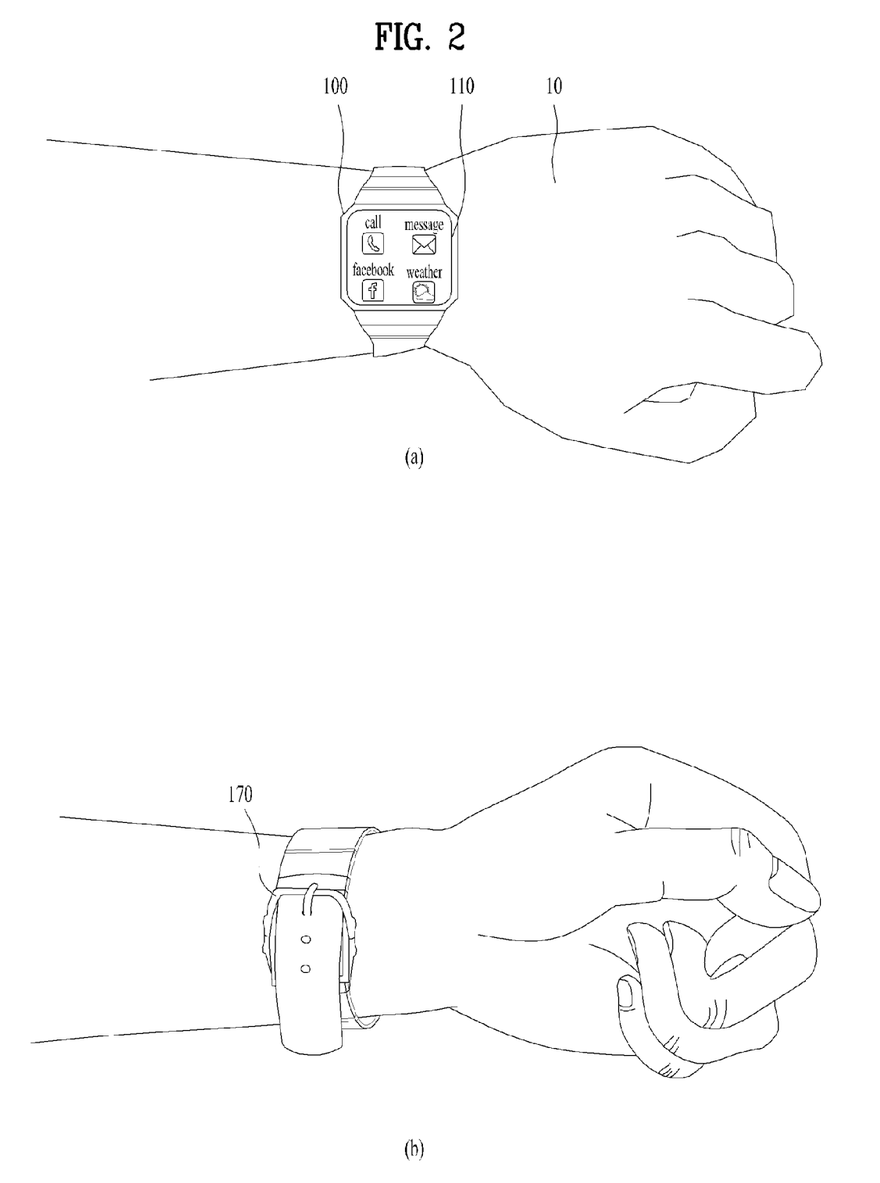
FIG. 2 is a view showing a smart watch according to one embodiment of the disclosure.

FIG. 2 is a view showing the smart watch according to one embodiment of the disclosure. More specifically, FIG. 2 shows a state in which the smart watch 100 is worn by the user designated by reference numeral 10. In other words, FIG. 2 shows a worn mode.

The smart watch 100 may implement a worn mode and an unworn mode. First, the worn mode, as exemplarily shown in FIG. 2(a), may correspond to a state in which the rear surface (not shown) of the smart watch 100 comes into contact with the wrist of the user 10. In addition, the worn mode, as exemplarily shown in FIG. 2(*b*), may correspond to a state in which a buckle 170 of the smart watch 100 is locked. Next, although the unworn mode is not shown in FIG. 2, the unworn mode may correspond to a state in which the rear surface (not shown) of the smart watch 100 does not come into contact with the wrist of the user 10. Additionally, the unworn mode may correspond to a state in which the buckle 170 of the smart watch 100 is not locked.

The smart watch 100 may determine the worn mode or the unworn mode based on the presence or absence of an input signal with regard to the rear surface of the smart watch 100 or the buckle 170 of the smart watch 100. In one embodiment, the smart watch 100 may determine the worn mode according to whether or not the rear surface (not shown) of the smart watch 100 comes into contact with the user 10. That is, the smart watch 100 may determine the worn mode based on the presence or absence of a touch input signal with regard to the rear surface (not shown) of the smart watch 100. In another embodiment, the smart watch 100 may determine the worn mode according to whether or not the buckle 170 of the smart watch 100 is locked. That is, the smart watch 100 may determine the worn mode based on the presence or absence of a touch signal of the buckle 170 of the smart watch 100. Also, in another embodiment, the smart watch 100 may determine the worn mode according to whether or not the rear surface (not shown) of the smart watch 100 comes into contact with the user as well as whether or not the buckle 170 is locked.

Figure 3:
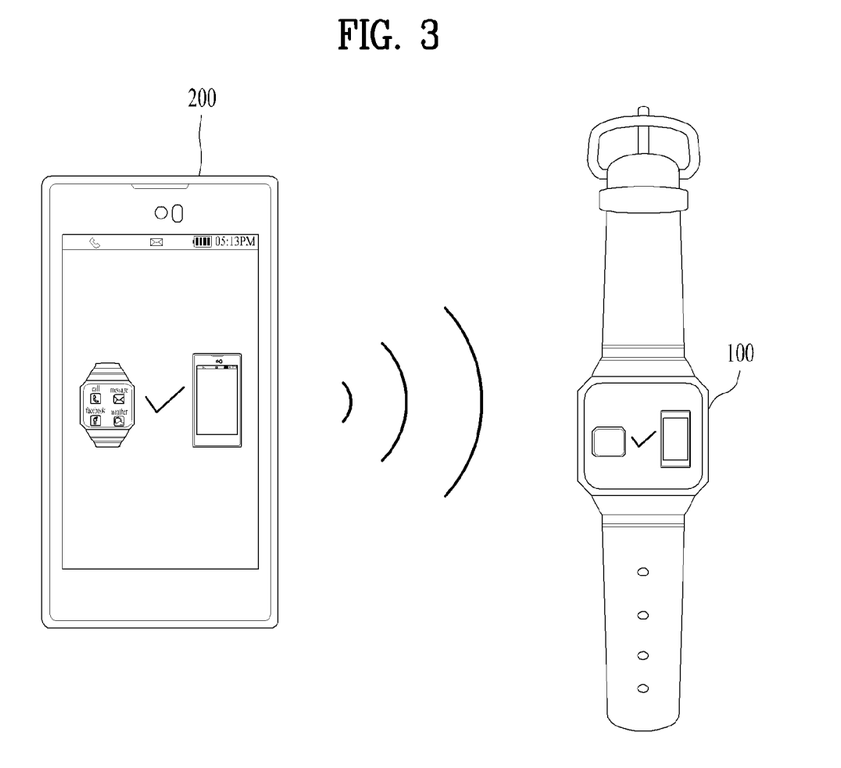
FIG. 3 is a view showing pairing between a smart watch and an external digital device according to one embodiment of the disclosure.

FIG. 3 is a view showing pairing between the smart watch and an external digital device according to one embodiment of the disclosure. More specifically, FIG. 3 shows pairing of the smart watch 100 with the external digital device 200, such as a smart-phone. Here, the external digital device 200 may include a smart-phone, a laptop computer, or a Portable Multimedia Player (PMP), for example.

Pairing refers to connection for data transmission/reception between the smart watch 100 and the external digital device 200. When performing pairing, the smart watch 100 and the external digital device 200 may establish communication to realize bidirectional data transmission/reception. In the disclosure, pairing may be performed via Bluetooth, Near-Field Communication (NFC), etc. In one example, pairing may be performed via user input using the smart watch 100 or the external digital device 200. Here, the user input may include touch input, voice input, etc. For example, the smart watch 100 may provide a separate button or user interface for communication with the external digital device 200. In addition, the user may realize communication between the smart watch 100 and the external digital device 200 via user input using the button or the user interface. Once communication is established, the smart watch 100 may transmit or receive data to or from the external digital device 200 through an open session.

In the disclosure, the smart watch 100 may perform pairing with the external digital device 200 using the communication unit (not shown). In addition, through pairing, the smart watch 100 may receive a notification indicating at least one event that is scheduled to occur after detecting the take-off signal, from the external digital device 200. In addition, the smart watch 100 may provide the user with the notification received from the external digital device 200.

Although not shown in FIG. 3, when performing pairing with the external digital device 200, the smart watch 100 may display an indicator, representing pairing success, on the display unit. In addition, when released from pairing with the external digital device 200, the smart watch 100 may display an indicator, representing that pairing has been released, on the display unit. This will hereinafter be described in detail with reference to FIG. 5.

Figure 4:
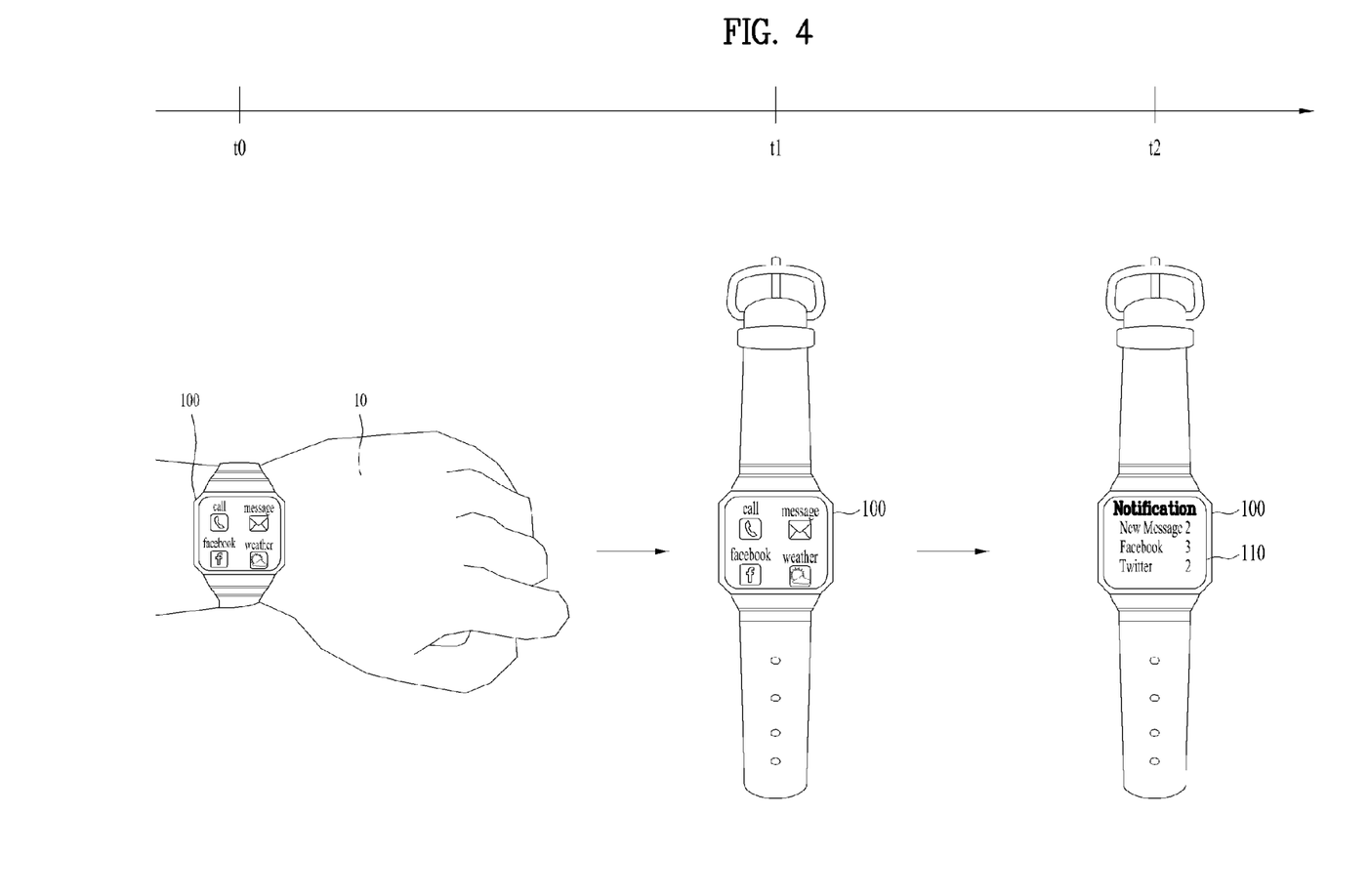
FIG. 4 is a view showing a first embodiment of a control method for a smart watch according to the disclosure.

FIG. 4 is a view showing a first embodiment of a control method for the smart watch according to the disclosure. More specifically, FIG. 4 shows provision of a notification in the case in which the smart watch 100 is switched from a worn mode (t0) to an unworn mode (t1).

First, a time t0 corresponds to a worn mode, i.e. a state in which the smart watch 100 is worn by the user 10. As described above with reference to FIG. 2, whether or not the smart watch 100 is worn may be determined based on the input signal with regard to at least one of the rear surface (not shown) of the smart watch 100 and the buckle (not shown) of the smart watch 100. In addition, at the time t0, the smart watch 100 may display a home screen or content that is in use from before. For example, as exemplarily shown in FIG. 4, at the time t0, the smart watch 100 displays a home screen, on which letters as well as icons, such as telephone symbols, etc., are displayed.

Next, at a time t1, the smart watch 100 may detect a take-off signal. More specifically, the smart watch 100 may detect the take-off signal while the smart watch 100 is worn by the user 10. The smart watch 100 may be switched to an unworn mode in response to the detected take-off signal. Here, the unworn mode may correspond to a state after the user 10 takes off the smart watch 100. In other words, the unworn mode may correspond to a mode in which a take-off operation is performed after a take-off instruction signal is detected.

Next, at a time t2, the smart watch 100 may provide a notification indicating at least one event that is scheduled to occur after detecting the take-off signal. In one embodiment, the provided notification indicating at least one event may correspond to a notification indicating at least one event, which is scheduled to occur after detecting the take-off signal. For example, the at least one event, which is scheduled to occur after detecting the take-off signal, may include reserved alarms, tasks to be performed, weather, etc. In another embodiment, the provided notification may correspond to a notification indicating at least one event that has not confirmed before the take-off signal is detected. For example, the at least one event not confirmed before the take-off signal is detected may include a missed call, an unconfirmed message, an unconfirmed Social Network Service (SNS) message, an unconfirmed e-mail, etc.

In addition, the above described notification indicating at least one event may be a voice notification, a letter notification, or an image notification, for example. Referring to FIG. 4, the smart watch 100 may provide, at the time t2, a letter notification indicating an unconfirmed new message and a message that newly appears in SNS. As will be appreciated from the embodiments described above, even if the smart watch 100 is switched from the worn mode to the unworn mode, the user 10 may receive, via the smart watch 100, a notification indicating an event that will occur later or an event that occurred before.

Although not shown in FIG. 4, the smart watch 100 may detect surrounding information on the smart watch 100. Here, the surrounding information may correspond to information regarding various surrounding factors detected by the smart watch 100. For example, the surrounding information may include at least one of audio information, position information, temperature information, and pressure information. In addition, in the unworn mode, the smart watch 100 may determine, based on the detected surrounding information, whether or not to provide a notification indicating at least one event that is scheduled to occur after detecting the take-off signal. For example, in the unworn mode, the smart watch 100 may display the same content as that displayed in the worn mode, rather than providing a notification, based on the detected surrounding information. In this case, additionally, the smart watch 100 may remain paired with the external digital device.

In one embodiment, if the user 10 temporarily takes off the smart watch 100 to wash their hands in a wash room, the smart watch 100 may detect position information on the wash room. In addition, the smart watch 100 may detect audio information on the wash room. In this case, since the user 10 will again soon wear the smart watch 100 after washing their hands, the smart watch 100 may be set so as not to provide a notification in the unworn mode when detecting position information or audio information on the wash room. Accordingly, in the unworn mode, the smart watch 100 may continuously display the same content as that displayed in the worn mode on the display unit 110. In this case, the smart watch 100 may remain paired with the external digital device (not shown).

In another embodiment, if the user 10 takes off the smart watch 100 in a bedroom, the smart watch 100 may detect position information on the bedroom. In this case, since the user 10 will not again wear the smart watch 100 for a long time, the smart watch 100 may be set so as to provide a notification indicating at least one event that is scheduled to occur after detecting the take-off signal, in the unworn mode if the smart watch 100 detects position information on the bedroom. Accordingly, in the unworn mode, the smart watch 100 may provide a notification indicating at least one event that is scheduled to occur after detecting the take-off signal, on the display unit 110. In this case, the smart watch 100 may unpair or remain paired with the external digital device (not shown) according to user selection or automatic setting.

Figure 5:
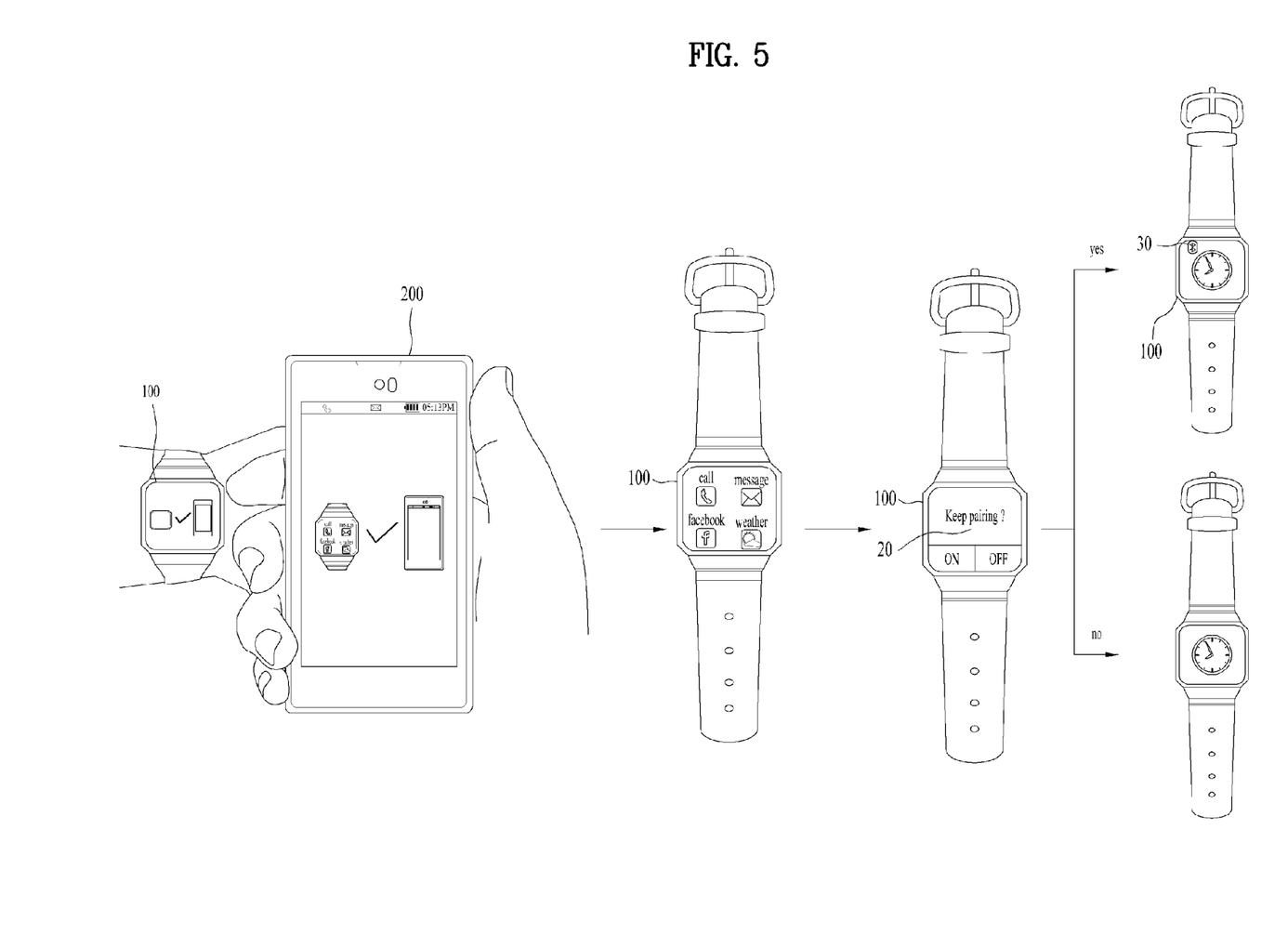
FIG. 5 is a view showing a second embodiment of a control method for a smart watch according to the disclosure.

FIG. 5 is a view showing a second embodiment of a control method for the smart watch according to the disclosure. More specifically, FIG. 5 shows whether or not to unpair between the smart watch 100 and the external digital device 200 if the smart watch 100 is switched from a worn mode to an unworn mode.

First, in a worn mode of the smart watch 100, the smart watch 100 may perform pairing with the external digital device 200. As described above with reference to FIG. 3, once pairing is completed, the smart watch 100 may transmit or receive data via communication with the external digital device 200. Next, the smart watch 100 may detect a take-off signal. Next, the smart watch 100 may be switched to an unworn mode in response to the detected take-off signal.

In this case, the smart watch 100 may display a pairing interface 20 on the display unit. The pairing interface 20 is used to set whether or not to unpair between the smart watch 100 and the external digital device 200. In one embodiment, when detecting an input signal with regard to the unpairing, the smart watch 100 may unpair with the external digital device 200. Here, the smart watch 100 may display an indicator (not shown) that represents the unpairing on the display unit. In another embodiment, when detecting an input signal with regard to the maintenance of pairing, the smart watch 100 may remain paired with the external digital device 200. Here, the smart watch 100 may display an indicator 30 representing that pairing is maintained, on the display unit. For example, referring to FIG. 5, the smart watch 100 may display the indicator 30, representing that Bluetooth communication is continued, on the display unit 110.

Meanwhile, upon detecting a take-off signal, the smart watch 100 may unpair with the external digital device 200, rather than displaying the pairing interface 20 on the display unit 110, according to automatic setting. In addition, upon detecting a take-off signal, the smart watch 100 may remain paired with the external digital device 200, rather than displaying the pairing interface 20 on the display unit 110, according to automatic setting. Here, the setting may include setting by user input, or automatic setting with regard to the smart watch 100, for example. Through the embodiments described above, the smart watch 100 may set or unpair according to whether or not the smart watch 100 is in use, which may reduce consumption of battery power.

Figure 6:
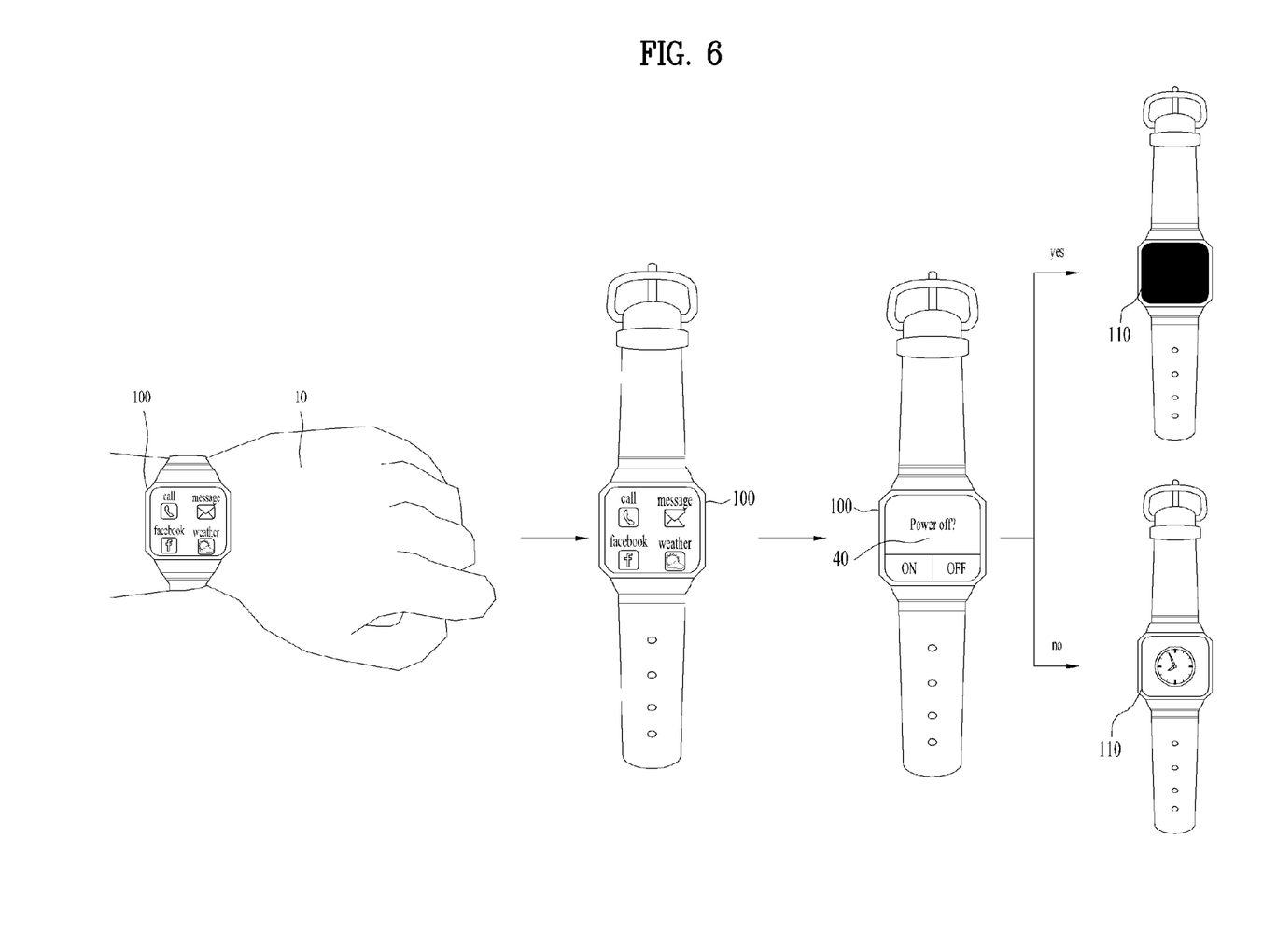
FIG. 6 is a view showing a third embodiment of a control method for a smart watch according to the disclosure.

FIG. 6 is a view showing a third embodiment of a control method for the smart watch according to the disclosure. More specifically, FIG. 6 shows power on/off of the smart watch 100 when the smart watch 100 is switched from a worn mode to an unworn mode.

First, as described above with reference to FIGS. 4 and 5, the smart watch 100 may detect a take-off signal in a worn mode thereof. Next, the smart watch 100 may be switched to an unworn mode in response to the detected take-off signal. In this case, the smart watch 100 may display a power on/off interface 40 on the display unit 110. The power on/off interface 40 is used to set whether or not to turn on or off the smart watch 100. In one embodiment, the smart watch 100 may be turned off upon detecting a power-off input signal with regard to the smart watch 100. In this case, the display unit 110 of the smart watch 100 may be deactivated. That is, no content may be displayed on the display unit 110 of the smart watch 100. Additionally, in this case, as described above with reference to FIG. 5, the smart watch 100 may unpair with the external digital device (not shown) according to user selection or automatic setting.

In another embodiment, upon detecting a power-on input signal with regard to the smart watch 100, the smart watch 100 may remain powered on. However, in this case, since the smart watch 100 is not worn by the user 10, the smart watch 110 may be switched to a standby mode in which preset content is displayed on the display unit 110. This is because it is unnecessary to operate the smart watch 100 as in the worn mode in a state in which the smart watch 100 is not worn by the user 10. Here, the preset content may correspond to content that may need to be continuously displayed even when the user 10 does not actively use the smart watch 100. For example, the preset content may include clock content, calendar content, schedule content, etc. Referring to FIG. 6, the preset content may correspond to clock content. In this case, additionally, as described above with reference to FIG. 5, the smart watch 100 may unpair or remain paired with the external digital device (not shown) according to user selection or automatic setting.

Meanwhile, the smart watch 100 may be set so as to be turned off, rather than displaying the power on/off interface 40 on the display unit 110, upon detecting a take-off signal. In addition, the smart watch 100 may be set so as to remain powered on, rather than displaying the power on/off interface 40 on the display unit 110, even if the smart watch 100 detects a take-off signal. Here, this setting may be performed via user input or automatic setting with regard to the smart watch 100, for example.

Figure 7:
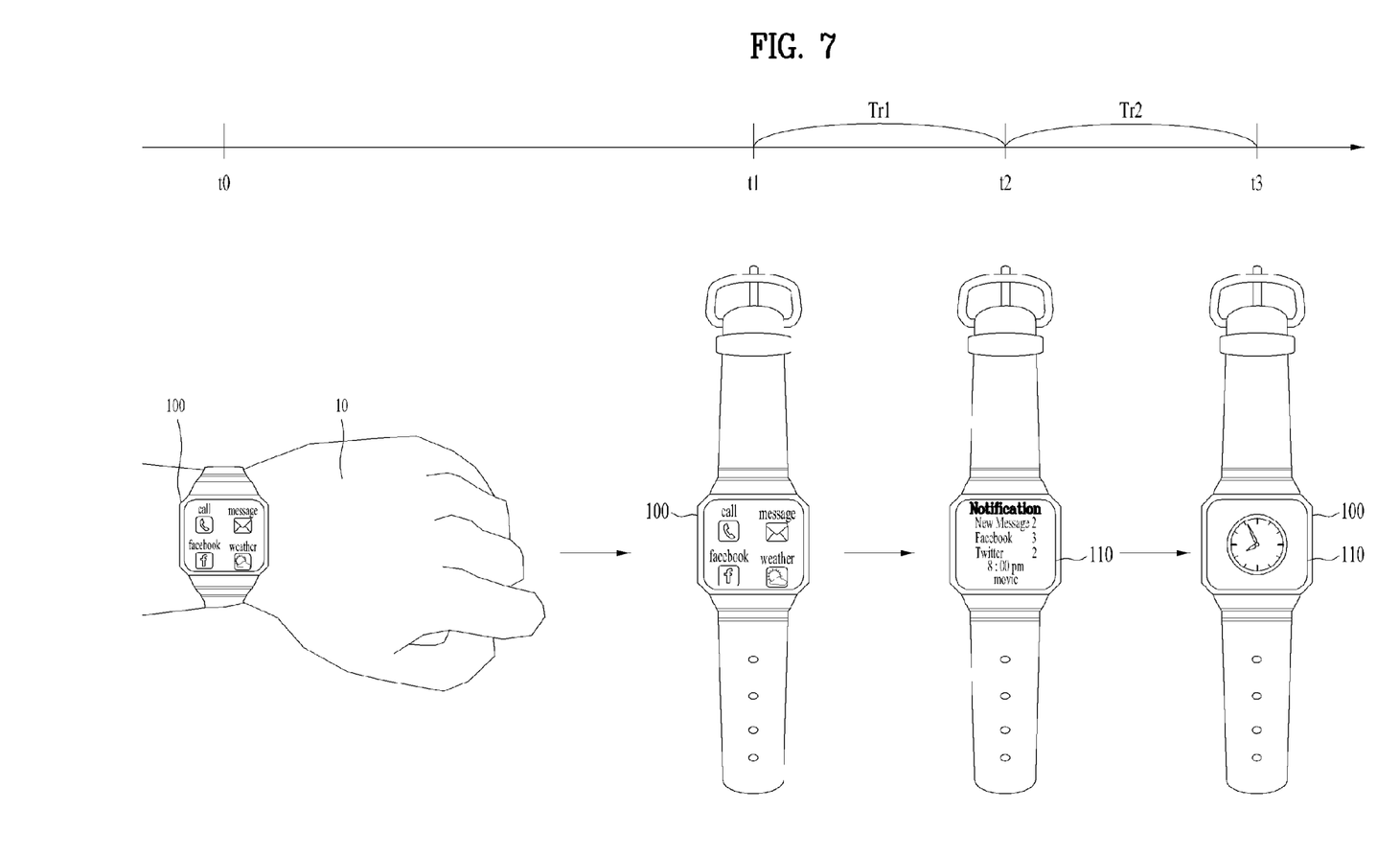
FIG. 7 is a view showing a fourth embodiment of a control method for a smart watch according to the disclosure.

FIG. 7 is a view showing a fourth embodiment of a control method for the smart watch according to the disclosure. More specifically, FIG. 7 shows content displayed on the smart watch 100 depending on the lapse of time if the smart watch 100 is switched from a worn mode (t0) to an unworn mode (t1).

First, as described above with reference to FIG. 4, the time t0 corresponds to a worn mode of the smart watch 100 in which the smart watch 100 is worn by the user 10. Next, at the time t1, the smart watch 100 may detect a take-off signal. In this case, the smart watch 100 may be switched to an unworn mode in response to the detected take-off signal. Next, at the time t2, the smart watch 100 may provide a notification indicating at least one event that is scheduled to occur after detecting the take-off signal. In addition, as described above with reference to FIG. 4, the smart watch 100 may provide a notification indicating at least one event, which has not confirmed before the take-off signal is detected, after a preset period Tr1 has passed from the detection time of the take-off signal.

Here, the time t2 may correspond to a time when the preset period Tr1 has passed from the take-off signal detection time t1. That is, the smart watch 100 may provide a notification indicating at least one event, which is scheduled to occur after detecting the take-off signal, after the preset period Tr1 has passed from the take-off signal detection time. This is because it is unnecessary to provide the notification if the user 10 again wears the smart watch 100 within the preset period Tr1 after the take-off signal is detected. Accordingly, if the user again wears the smart watch 100 within the preset period Tr1 after the take-off signal is detected, the smart watch 100 may again be switched to the worn mode. In this case, the smart watch 100 may display the same content as that displayed in the worn mode on the display unit 110.

In addition, the smart watch 100 may provide a notification indicating at least one event, which is scheduled to occur later on the basis of a take-off time, for a preset period Tr2 starting from the time t2. In addition, the smart watch 100 may provide a notification indicating at least one event, which has not confirmed before the take-off time, for the preset period Tr2 starting from the time t2. Here, since the notification indicating at least one event is provided for the preset period Tr2, the provision time of the notification may be changed based on the number of events. Next, at a time t3, the smart watch 100 may be switched to a first mode in which the display unit 110 is deactivated. Here, the first mode, as described above with reference to FIG. 6, may correspond to a power-off mode of the smart watch 100. In addition, at the time t3, as exemplarily shown in FIG. 7, the smart watch 100 may be switched to a second mode in which preset content is displayed on the display unit 110. Here, the second mode may correspond to a mode in which the smart watch 100 remains powered on and is switched to the standby mode. Meanwhile, the smart watch 100 may display the power on/off interface (not shown) as exemplarily shown in FIG. 6 after provision of the notification. In this case, the smart watch 100 may detect an input signal with regard to the power on/off interface (not shown), and provide at least one of the first mode or the second mode based on the detected input signal.

Meanwhile, although not shown in FIG. 7, the smart watch 100 may unpair with the external digital device (not shown) when switched to the first mode after provision of the notification. In addition, when switched to the second mode after provision of the notification, the smart watch 100 may remain paired with the external digital device (not shown). In this case, the smart watch 100 may display a pairing interface on the display unit after provision of the notification, thereby determining whether or not to remain paired in response to user input.

Figure 8:
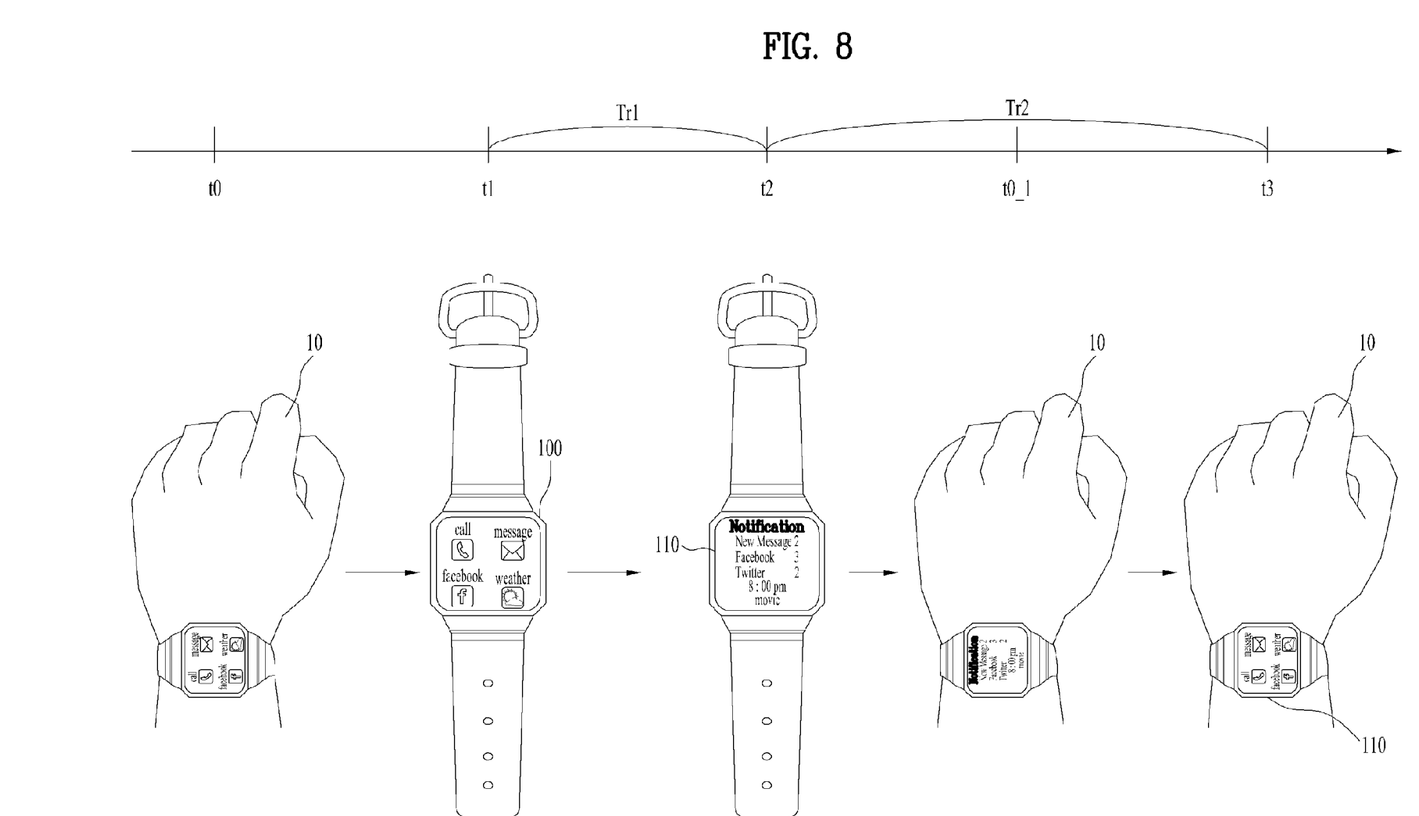
FIG. 8 is a view showing a fifth embodiment of a control method for a smart watch according to the disclosure.

FIG. 8 is a view showing a fifth embodiment of a control method for the smart watch according to the disclosure. More specifically, FIG. 8 shows variation of content to be displayed on the smart watch 100 depending on the lapse of time when the smart watch 100 is switched from a worn mode (t0) to an unworn mode (t1).

First, as described above with reference to FIG. 7, the time t0 corresponds to a worn mode of the smart watch 100 in which the smart watch 100 is worn by the user 10. Next, at the time t1, the smart watch 100 may detect a take-off signal. Next, at the time t2, the smart watch 100 may provide a notification indicating at least one event, which is scheduled to occur after detecting the take-off signal. Here, as described above with reference to FIG. 7, the time t2 may correspond to a time when the preset period Tr1 has passed from the take-off signal detection time t1.

Next, the smart watch 100 may provide the notification for the preset period Tr2 starting from the time t2. As described above with reference to FIG. 4, the notification may be a voice notification, a letter notification, or an image notification, for example. Meanwhile, the smart watch 100 may detect a wear signal at a time t0_1 within the preset period Tr2 for which the notification is provided. Here, the wear signal, as described above with reference to FIG. 1, is a signal indicating that the smart watch 10 is worn by the user 10, and may correspond to an input signal with regard to the rear surface (not shown) of the smart watch 100 or the buckle (not shown) of the smart watch 100. In this case, the smart watch 100 may be switched to the worn mode, and may stop provision of the notification. For example, referring to FIG. 8, the smart watch 100 may no longer provide the current notification, and may display the same content as that displayed in the worn mode (the time t0) on the display unit 110.

Meanwhile, although not shown in FIG. 8, the smart watch 100 may display an interface, which is used to set whether or not to provide a notification indicating at least one residual event if provision of the notification stops at the time t0_1 as the user 10 again wears the smart watch 100. In this case, the smart watch 100 may provide residual notifications in the worn mode in response to an input signal with regard to the interface. Here, the input signal with regard to the interface may correspond to an input signal to request provision of residual notifications. In addition, the smart watch 100 may display the same content as that in the worn mode, rather than providing the residual notifications in the worn mode, in response to an input signal with regard to the interface. Here, the input signal with regard to the interface may correspond to an input signal to reject provision of residual notifications.

Figure 9:
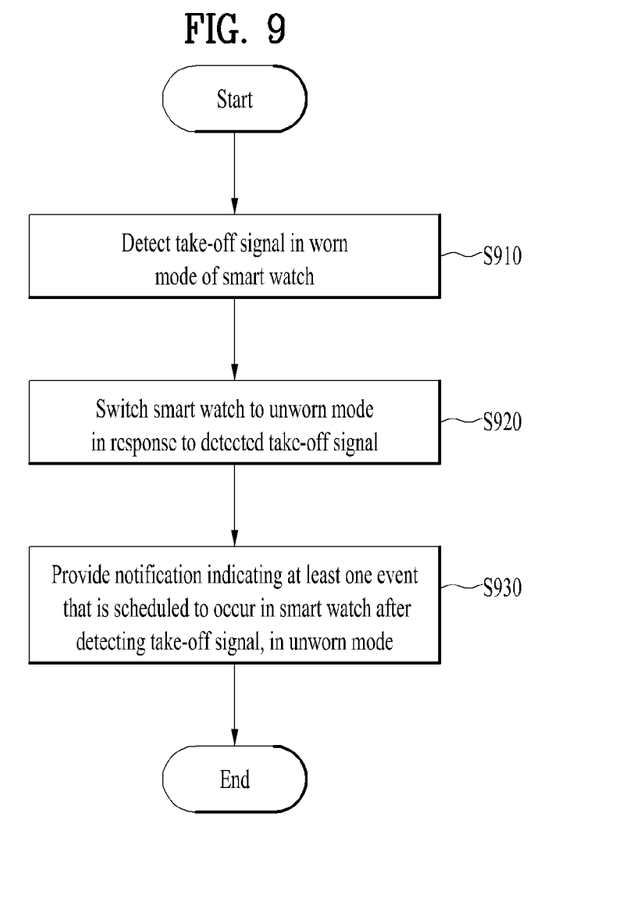
FIG. 9 is a flowchart showing a control method for a smart watch according to the disclosure.

FIG. 9 is a flowchart showing a control method for the smart watch according to the disclosure. Each operation of FIG. 9 that will be described hereinafter may be controlled by the processor 140 of the smart watch 100 as exemplarily shown in FIG. 1.

First, the smart watch may detect a take-off signal in a worn mode (S910). Here, the take-off signal, as described above with reference to FIG. 2, may correspond to a signal detected via at least one of the rear surface of the smart watch or the buckle of the smart watch. In addition, as described above with reference to FIG. 3, the smart watch may perform pairing with the external digital device using the communication unit in the worn mode.

Next, the smart watch may be switched to an unworn mode in response to the detected take-off signal (S920). In this case, as described above with reference to FIG. 3, the smart watch may receive a notification indicating at least one event that is scheduled to occur after detecting the take-off signal, from the external digital device in response to the detected take-off signal. In addition, the smart watch may receive a notification indicating at least one event, which has not confirmed before the take-off signal is detected, from the external digital device in response to the detected take-off signal.

Next, the smart watch may provide a notification indicating at least one event, which is scheduled to occur after detecting the take-off signal (S930). For example, in the unworn mode, the smart watch may provide a notification indicating at least one event received from the external digital device. In addition, the smart watch may provide a notification indicating at least one event, which has not confirmed before the take-off signal is detected. As described above with reference to FIG. 7, the smart watch may provide a notification indicating at least one event that is scheduled to occur after detecting the take-off signal, after a preset period has passed from the take-off signal detection time. Meanwhile, the smart watch, as described above with reference to FIG. 8, may be switched to the worn mode if a wear signal is detected within the preset period after the take-off signal is detected. Meanwhile, as described above with reference to FIG. 4, the notification indicating at least one event may include at least one notification indicating a scheduled event selected from among a voice notification, a letter notification, and an image notification. In addition, as described above with reference to FIG. 5, the smart watch may unpair or remain paired with the external digital device by user selection or automatic setting after the notification indicating at least one event is provided.

Figure 10:
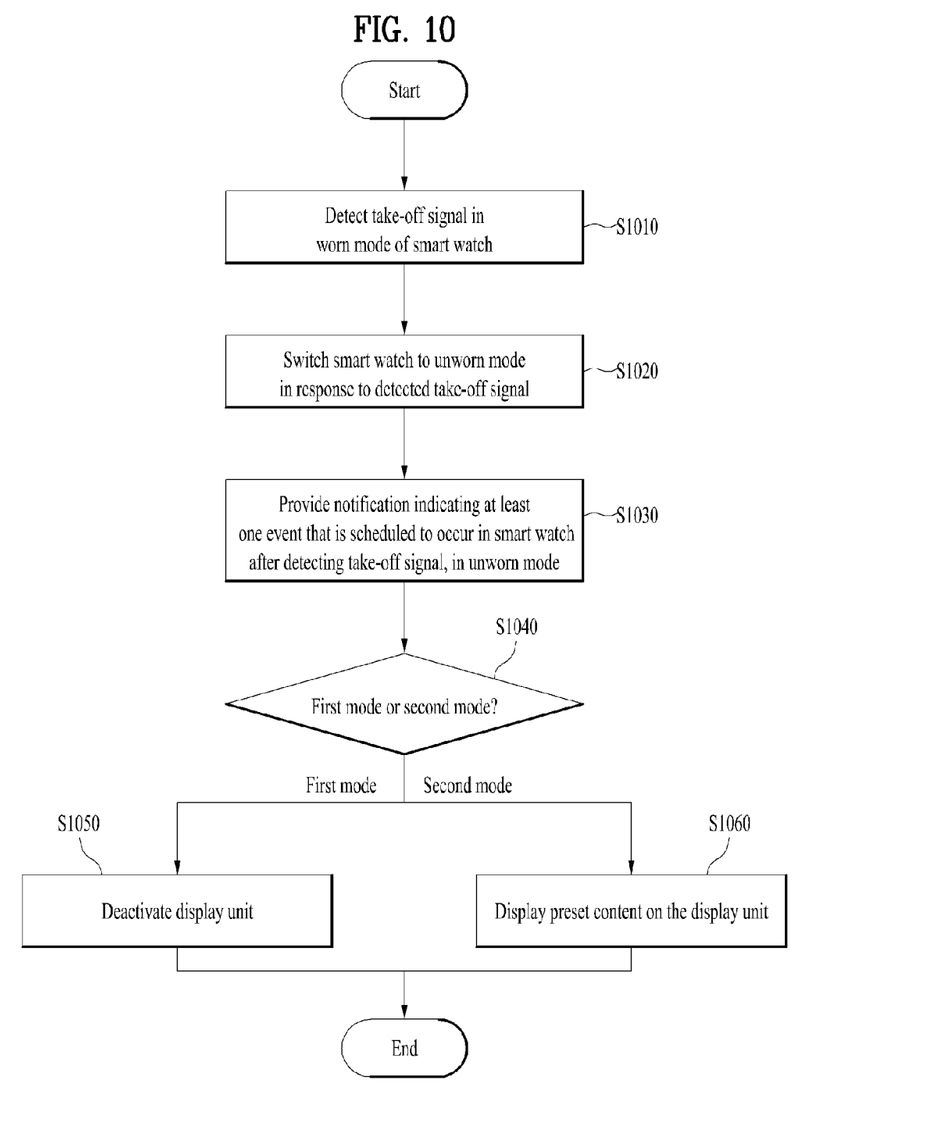
FIG. 10 is a flowchart showing a control method for a smart watch according to the disclosure.

FIG. 10 is a flowchart showing a control method for the smart watch according to the disclosure. Each operation of FIG. 10 that will be described hereinafter may be controlled by the processor 140 of the smart watch 100 as exemplarily shown in FIG. 1. In addition, in the embodiment of FIG. 10, a detailed description of the same or similar parts as those in the above described embodiment of FIG. 9 will be omitted.

First, as described above with reference to FIG. 9, the smart watch may detect a take-off signal in a worn mode (S1010). Next, the smart watch may be switched to an unworn mode in response to the detected take-off signal (S1020). Next, the smart watch may provide a notification indicating at least one event, which is scheduled to occur after detecting the take-off signal.

Next, the smart watch may determine whether to be switched to a first mode or a second mode (S1040). Here, switching to the first mode or the second mode may be determined based on a user input signal, or may be performed according to automatic setting.

If switching to the first mode is determined in Operation S1040, the smart watch may deactivate the display unit (S1050). That is, as described above with reference to FIG. 6, the smart watch may be turned off in the first mode. In addition, the smart watch, as described above with reference to FIG. 5, may unpair with the external digital device in the first mode.

On the other hand, if switching to the second mode is determined in Operation S1040, the smart watch may display preset content on the display unit (S1060). In addition, as described above with reference to FIG. 6, the smart watch may remain powered on in the second mode. In addition, as described above with reference to FIG. 5, the smart watch may remain paired with the external digital device in the second mode. Alternatively, the smart watch may unpair with the external digital device by user selection or automatic setting.

Although not shown in FIG. 10, as described above with reference to FIG. 4, the smart watch may detect surrounding information. In addition, the smart watch may be switched, based on the detected surrounding information, from the unworn mode to a third mode in which the notification indicating at least one event, which is scheduled to occur after detecting the take-off signal, is not provided. In the third mode, the smart watch may display the same content as that displayed in the worn mode on the display unit. In addition, as described above with reference to FIG. 4, the smart watch may remain paired with the external digital device in the third mode. However, the smart watch may unpair with the external digital device by user selection or automatic setting.

Although the respective drawings have been described individually for convenience, the embodiments described in the respective drawings may be combined to realize novel embodiments. In addition, designing a computer readable recording medium in which a program to execute the above described embodiments is recorded according to a need of those skilled in the art is within the scope of the disclosure.

The smart watch and the control method for the same according to the disclosure are not limited to the configurations and methods of the above described embodiments, and all or some of the embodiments may be selectively combined to achieve various modifications.

Meanwhile, the smart watch and the control method for the same according to the disclosure may be implemented as code that can be written on a processor readable recording medium and thus read by a processor provided in a network device. The processor readable recording medium may be any type of recording device in which data is stored in a processor readable manner. Examples of the processor readable recording medium include a ROM, a RAM, a magnetic tape, a floppy disc, an optical data storage device, and a carrier wave (e.g., data transmission over the Internet). Also, the processor readable recording medium can be distributed over a plurality of computer systems connected to a network so that processor readable code is written thereto and executed there from in a decentralized manner.

As is apparent from the above description, according to one embodiment, even if a user takes off a smart watch, it is possible to allow the user to previously confirm a message or notice that will appear after the smart watch is taken off.

Further, according to one embodiment, even if the user takes off the smart watch, it is possible to allow the user to confirm a message or notice that has not been confirmed while the smart watch is worn by the user.

Furthermore, according to one embodiment, it is possible to achieve automated mode switching of the smart watch based on a place where the user who wears the smart watch is present, a surrounding temperature of the smart watch, and a signal generated around the smart watch.

Although embodiments have been described with reference to a number of illustrative embodiments thereof, it should be understood that the disclosure is not limited to the above described particular embodiments, and numerous variations, modifications, and other embodiments may be devised by those skilled in the art that will fall within the spirit and scope of the principles of this disclosure, drawings and the appended claims.

In addition, the disclosure describes both an object invention and a method invention, and description of both inventions may be selectively applied as necessary.

What is claimed is:

1. A smart watch comprising:
a display unit configured to display content;
a communication unit configured to transmit and receive data;
a sensor unit configured to detect an input signal to the smart watch and transmit the detected input signal to a processor; and
the processor configured to control the display unit, the communication unit, and the sensor unit,
wherein the processor is further configured to:
detect a take-off signal in a worn mode of the smart watch, wherein the take-off signal is a signal indicating that the smart watch is separated from a user, switch the smart watch to an unworn mode in response to the detected take-off signal, and provide a notification indicating at least one event that is scheduled to occur after detecting the take-off signal, in the unworn mode, wherein the notified at least one event excludes an event which has not been confirmed before the detecting of the take-off signal.

2. The smart watch according to claim 1, wherein the processor is further configured to switch the smart watch to at least one of a first mode in which the display unit is deactivated and a second mode in which preset content is displayed on the display unit, in the unworn mode.

3. The smart watch according to claim 2, wherein the processor is further configured to detect an input signal to the smart watch in the unworn mode, and switch to at least one of the first mode and the second mode based on the detected input signal.

4. The smart watch according to claim 2, wherein the processor is further configured to switch the smart watch to at least one of the first mode and the second mode after providing the notification indicating at least one event that is scheduled to occur after detecting the take-off signal for a preset period in the unworn mode.

5. The smart watch according to claim 2, wherein the processor is further configured to perform pairing between the smart watch and an external digital device using the communication unit.

6. The smart watch according to claim 5, wherein the processor is further configured to receive the notification indicating at least one event that is scheduled to occur after detecting the take-off signal from the external digital device, in response to the detected take-off signal, and provide the received notification indicating at least one event in the unworn mode.

7. The smart watch according to claim 5, wherein the processor is configured to unpair between the smart watch and the external digital device if the smart watch is switched to the first mode, and maintain pairing between the smart watch and the external digital device if the smart watch is switched to the second mode.

8. The smart watch according to claim 7, wherein the processor is further configured to display an indicator representing unpairing on the display unit if unpairing between the smart watch and the external digital device occurs.

9. A control method for a smart watch, the control method comprising:

detecting a take-off signal in a worn mode of the smart watch, wherein the take-off signal is a signal indicating that the smart watch is separated from a user;

switching the smart watch to an unworn mode in response to the detected take-off signal; and providing a notification indicating at least one event that is scheduled to occur after detecting the take-off signal, in the unworn mode, wherein the notified at least one event excludes an event which has not been confirmed before the detecting of the take-off signal.

\* \* \* \* \*